G. P. PITKIN.
TEMPERATURE INDICATOR FOR ENGINE WATER CIRCULATION.
APPLICATION FILED NOV. 18, 1919.

1,343,088.

Patented June 8, 1920.

WITNESSES
Wynne Johnson
S. W. Foster

INVENTOR
George P. Pitkin
BY
ATTORNEYS

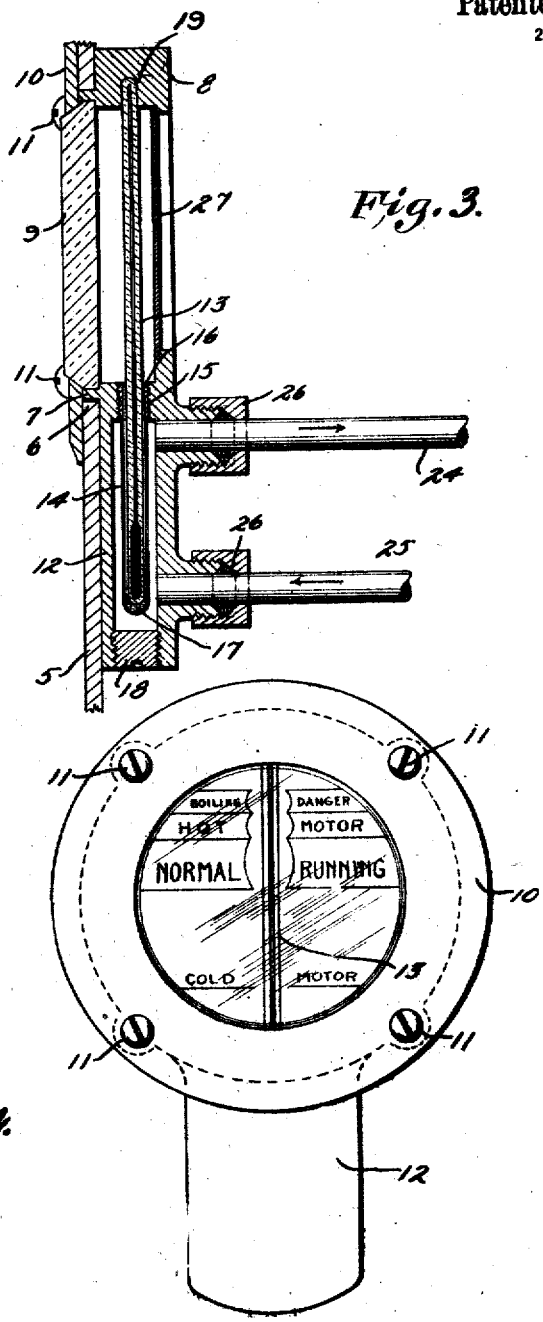

UNITED STATES PATENT OFFICE.

GEORGE P. PITKIN, OF BERGENFIELD, NEW JERSEY.

TEMPERATURE-INDICATOR FOR ENGINE-WATER CIRCULATION.

1,343,088.     Specification of Letters Patent.     Patented June 8, 1920.

Application filed November 18, 1919. Serial No. 338,937.

*To all whom it may concern:*

Be it known that I, GEORGE P. PITKIN, a citizen of the United States, and a resident of Bergenfield, in the county of Bergen and State of New Jersey, have invented a new and Improved Temperature-Indicator for Engine-Water Circulation, of which the following is a full, clear, and exact description.

This invention relates to improvements in temperature indicators for engine water circulations, and more particularly to improved means for supporting a thermometer on the dashboard of an automobile, aeroplane, or other similar device and maintain said thermometer in direct communication with the water circulating through the cooling system of the engine so that the operator can see at all times the temperature of such water.

An object of the invention is to provide improved mounting for a thermometer and improved means for connecting the same with the water circulating system.

With these and other objects in view the invention consists in certain novel features of construction, and combinations and arrangements of parts as will be more fully hereinafter described and pointed out in the claims.

In the accompanying drawings—

Fig. 3 is a view in vertical section showing the mounting of the thermometer; and Fig. 4 is a view in elevation of the thermometer mounting.

Figure 1:
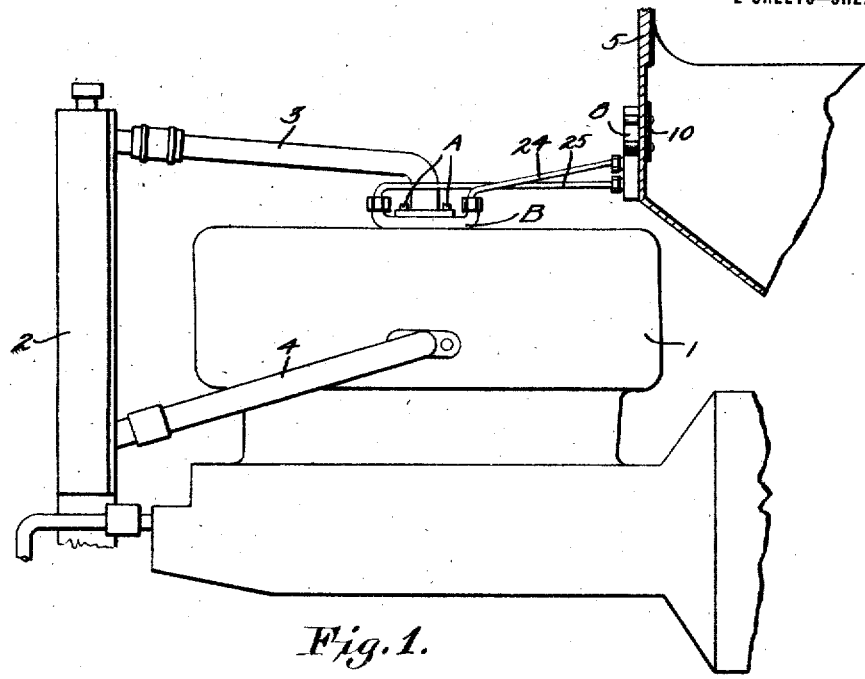
Figure 1 is a view partly in side elevation and partly in section illustrating my improvements in connection with the engine and dashboard of an automobile.
Figure 2:
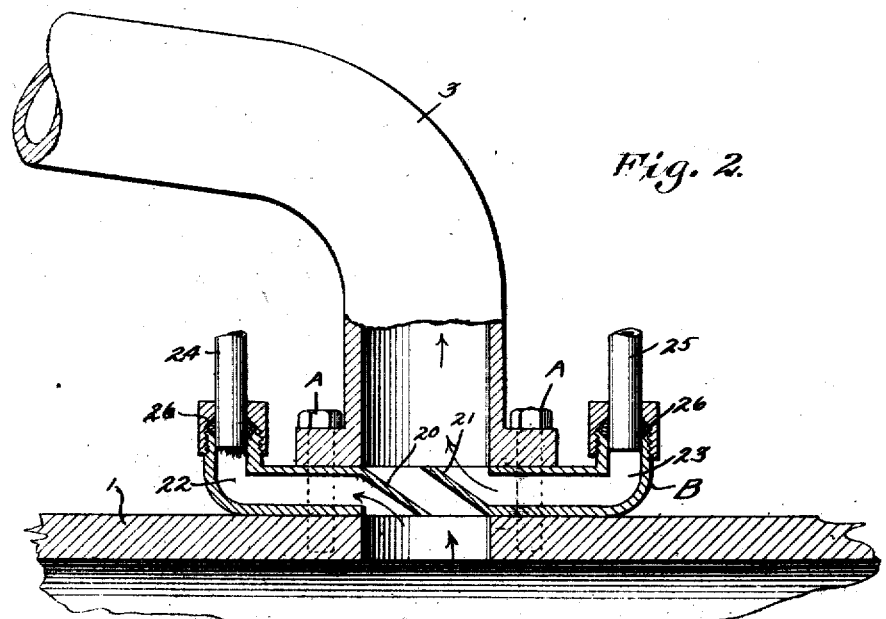
Fig. 2 is an enlarged fragmentary view in section illustrating my improved water circulating coupling B.

1 represents an internal combustion engine, 2 a radiator, 3 and 4 manifolds connecting the radiator with the water jacket of the engine, and 5 is a dashboard of an automobile or it may be assumed that this dashboard forms a part of an airship or other motor-propelled vehicle as my improvements are adapted for use on any such apparatus.

The dashboard 5 is provided with an opening 6 receiving a circular enlargement 7 on a casing 8 and a glass lens 9 is secured within the enlargement 7 by means of a ring 10 which bears against the edges of the lens and is secured by screws 11, the latter extending through the dashboard and into the casing 8 serving to hold the latter rigidly to the dashboard as well as secure the glass lens in place.

The casing 8 is made with an integral depending extension 12 and a thermometer 13 extends vertically across the casing and down into the extension 12. A protecting casing 14 of general tubular form incloses the lower end of the thermometer and has screw threaded engagement with the lower portion of casing 8, as shown at 15, and a filling of cement 16 is located between the upper end of the protecting casing 14 and the thermometer to hold the thermometer rigidly in place. The protecting casing 14 is provided with the desired quantity of graphite grease 17 around the bulb of the thermometer to insure the free transmission of heat from the metal of the protecting casing of the thermometer bulb, and at the same time allow for expansion and contraction without danger of breaking the bulb.

The lower end of the extension 12 is closed by a plug 18 which provides an entrance for the thermometer 13 and the upper end of the thermometer 13 is secured in a recess 19 in the upper portion of the casing 8 and is held against movement. The extension 12 constitutes a water chamber exposing the thermometer to the temperature of the water in the engine system, as will now be described.

Between the manifold 3 and the engine casing, I locate a coupling B which is clamped in place by bolts A securing the manifold to the engine. This coupling B has a pair of deflecting walls 20 and 21 directing the water into a passage 22 and from a passage 23 into the manifold. The passages 22 and 23 are connected by pipes 24 and 25 with the hollow extension 12 and packing glands 26 are provided on the extension 12 and on the coupling B to prevent leakage and allow expansion and contraction.

By reason of the construction above described, it will be noted that the water circulating through the water jacket of the engine will also circulate through the pipes 24 and 25 and maintain the water chamber of the extension 12 filled with water of the same temperature as the circulating water of the engine. This water will convey its temperature to the thermometer 13 and the latter will display at all times to the driver the temperature of the water in circulation.

To make this reading of the chamber a more convenient one I locate a dial plate 27 back of the thermometer and provide on the dial plate certain captions, preferably as follows: "Cold motor" "Normally running" "Hot motor" "Boiling danger". The driver can therefore tell at a glance just what is the temperature of the water and when this reaches a danger point, he knows at once that he should give the matter attention.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. The combination with a motor vehicle, of a casing secured to the automobile and spaced from the engine, a thermometer in the casing, a coupling secured between a water manifold and the engine casing, said coupling having deflectors therein and having passages at opposite sides the deflectors, and pipes connecting said passages with said casing.

2. The combination with a motor vehicle having a dashboard, of a casing secured to the dashboard, a thermometer in the casing, an extension on the casing constituting a water chamber inclosing the bulb of the thermometer, a coupling secured between a water manifold and the engine casing, said coupling having deflectors therein and having passages at opposite sides of the deflectors, and pipes connecting said passages with said extension.

3. The combination with a motor vehicle, and a dashboard thereon having an opening therein, a casing, a circular projection on the casing located in said opening, a glass lens in said projection, a ring positioned around the lens, screws projected through the ring of the dashboard and into the extension clamping said parts together, a dial plate in the casing, a downwardly projecting extension on the casing constituting a water chamber, a thermometer secured in the casing and having its bulb in the extension, and means connecting the extension with the water circulating system of the engine.

4. The combination with a motor vehicle, and a dashboard thereon having an opening therein, a casing, a circular projection on the casing located in said opening, a glass lens in said projection, a ring positioned around the lens, screws projected through the ring of the dashboard and into the extension clamping said parts together, a dial plate in the casing, a downwardly projecting extension on the casing constituting a water chamber, a thermometer secured in the casing and having its bulb in the extension, a screw plug closing the end of the extension, a metal protecting casing around the bulb in the extension, and water circulating pipes communicating with the extension and connecting the same with the water circulating system of the engine.

GEORGE P. PITKIN.